Patented Sept. 17, 1929

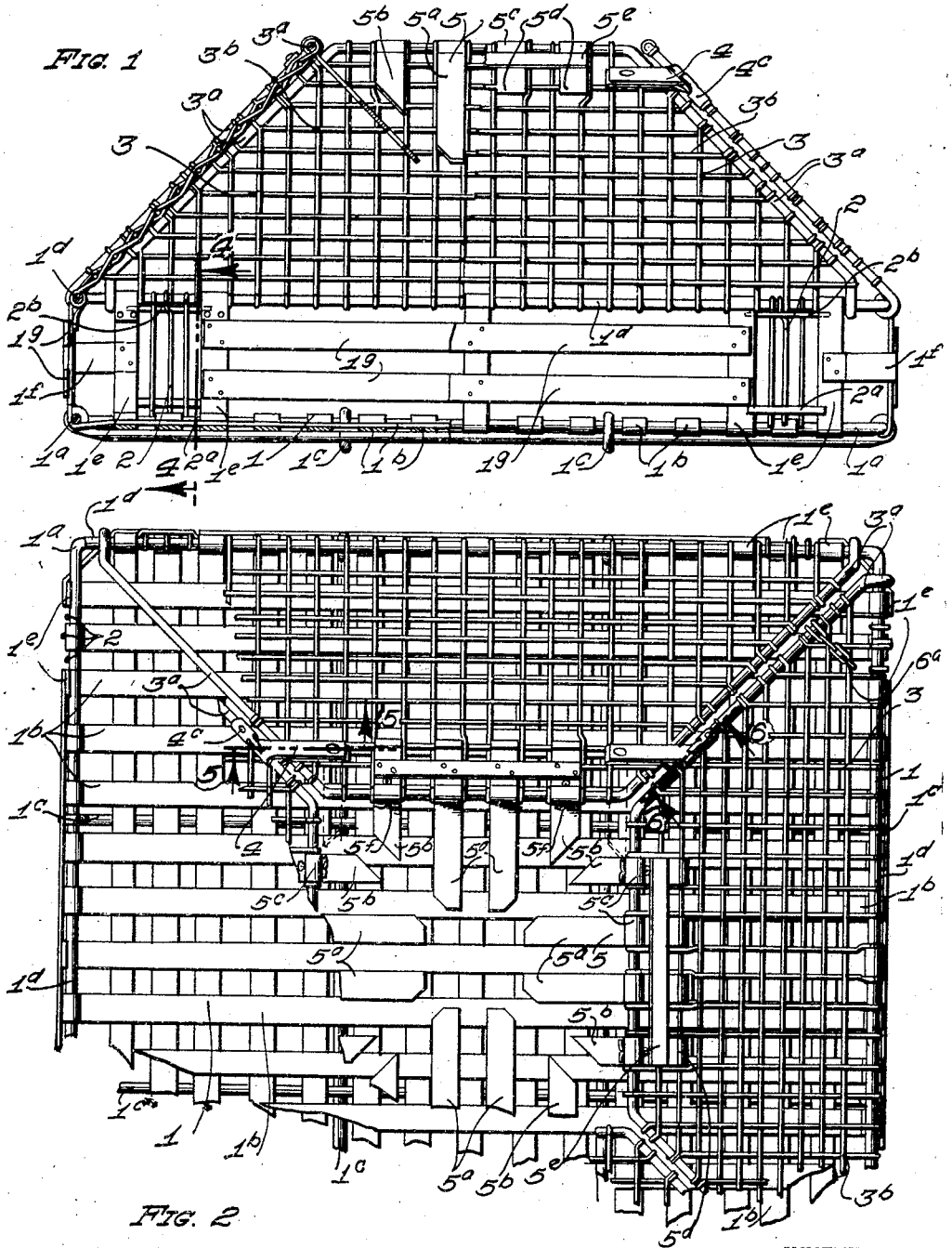

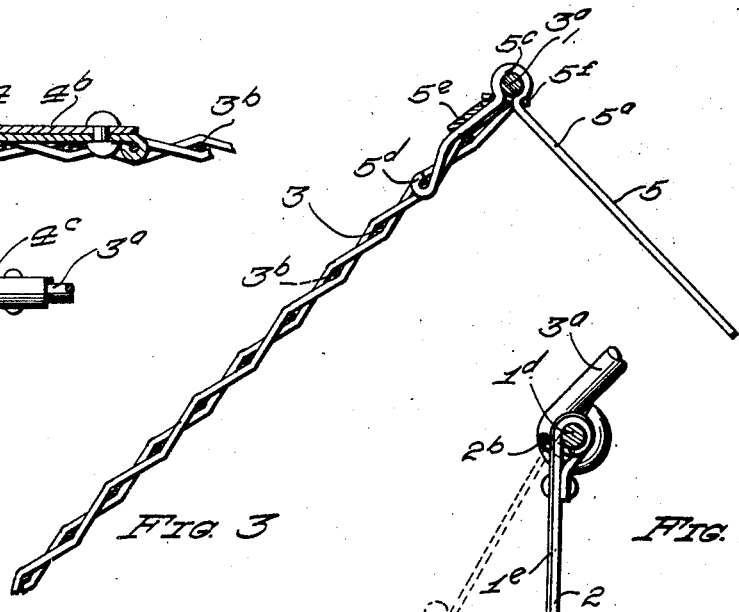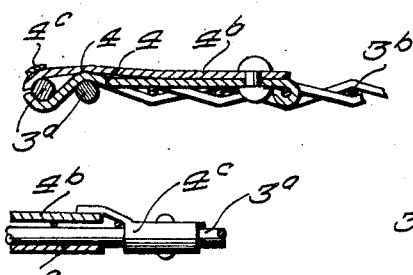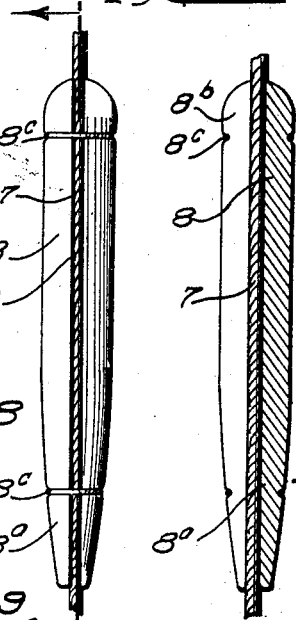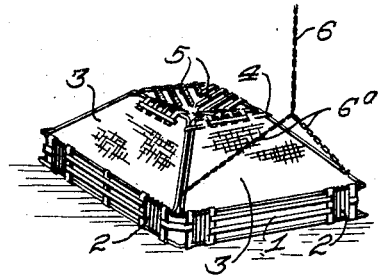

1,728,645

UNITED STATES PATENT OFFICE

FRANKLIN P. WARD AND OSCAR J. GOSSER, OF SAN DIEGO, CALIFORNIA

LOBSTER TRAP

Application filed November 2, 1927. Serial No. 230,589.

Our invention relates to traps, more particularly to traps for catching lobsters or the like and the objects of our invention are: first, to provide a device of this class which is selective and therefore adapted to catch only the marketable sized lobsters; second, to provide a device of this class which is provided with exit trap doors which are large enough to accommodate only the small sized lobsters; third, to provide a device of this class which may be collapsed in compact form for shipment; fourth, to provide a device of this class which prevents undesirable sea animals or fish from stealing the bait; fifth, to provide a device of this class which will hold a large number of lobsters at a time; sixth, to provide a device of this class which prevents the oversize lobster from being caught; seventh, to provide a device of this class which is made entirely of metal and is extremely sturdy of construction; eighth, to provide a device of this class which is suitable to catch either lobsters or crabs; ninth, to provide a device of this class which will operate in substantially any position except upside down; tenth, to provide a float in connection with a device of this class which permits sea weed to pass without entangling with the float line and drag the trap away, and eleventh, to provide a device of this class which is simple of construction, compact, efficient in its action, durable, easily handled and which will not readily deteriorate or get out of order.

With these and other objects in view, as will appear hereinafter, our invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of our lobster trap, with parts and portions broken away and in section to facilitate the illustration; Fig. 2 is a fragmentary top or plan view thereof; Fig. 3 is an enlarged fragmentary sectional view thereof through 3—3 of Fig. 2; Fig. 4 is an enlarged fragmentary sectional view through 4—4 of Fig. 1 showing the trap exit doors; Fig. 5 is a fragmentary sectional view of the clamp means for holding the sides of the trap together taken through 5—5 of Fig. 2; Fig. 6 is a sectional view thereof through 6—6 of Fig. 2; Fig. 7 is a perspective view of the trap and float; Fig. 8 is an enlarged elevational view of the trap float, and Fig. 9 is a sectional view thereof through 9—9 of Fig. 8.

Similar characters of reference refer to similar parts and portions throughout the several views of the drawings.

The cage base member 1, trap exit doors 2, inclined side members 3, cage clamp members 4, trap fingers 5, float chain 6, float cord 7, and float 8, constitute the principal parts and portions of our lobster trap.

The cage base 1 is provided with a heavy, bottom frame $1^a$. Secured to and extending between opposite sides of the frame $1^a$ are a plurality of metal bands $1^b$. Interspersed between the metal bands $1^b$ are brace rods $1^c$. The brace rods extending between a pair of the opposite sides are positioned below other brace rods and metal bands forming skids to facilitate the handling of the trap from a boat, wharf or the like. A pair of the metal bands $1^b$ which intersect with the frame $1^a$ near each corner thereof extend upwardly and are secured to an upper frame $1^d$, forming trap door frames $1^e$, as shown best in Figs. 1, 2 and 5 of the drawings. The substantially centrally positioned metal bands $1^b$ also extend up and are secured to the upper frame $1^d$. The side of the trap door frame $1^e$ nearest the corners of the cage are joined together by a horizontally extending metal band $1^f$. Similar bands $1^g$ connect the inner side of the trap door frame $1^e$, forming relatively low upwardly extending sidewalls as shown in Fig. 1 of the drawings.

Between the trap door frame $1^e$ and pivotally secured to the upper frame member $1^d$ are exit trap doors 2, there being two on each side of the cage. The lower portion of the trap exit doors 2 is provided with a laterally positioned piece of metal $2^a$ which holds the several wire bars in spaced relation and extends partway across the trap door frame 1ᵉ. Secured to the upper portion of the trap exit door frame 1ᵉ and extending across the outside of the trap exit door 2 is a wire stop member 2ᵇ which limits the pivotal movement of the trap door 2.

Heavy metal frames 3ᵃ are provided which are pivotally connected to each side of the upper frame member 1ᵈ near the corners thereof. Each frame 3ᵃ and the corresponding side of the upper frame member 1ᵈ form a substantially trapezoidal shaped inclined side member 3. A heavy gauge wire mesh 3ᵇ is positioned over the frame 3ᵃ and pivotally secured at its one side to the upper frame member 1ᵈ as shown best in Figs. 1 and 2 of the drawings.

On two of the side members 3 are positioned clamp members 4 near the upper outer ends thereof, as shown in Figs. 1 and 2 of the drawings. The clamp members 4 are divided into two segments, 4ᵃ and 4ᵇ, the segment 4ᵃ of which extends under the frame 3ᵃ of the remaining cage side members 3 as shown best in Fig. 5 of the drawings. The segment 4ᵇ is pivotally connected to the segment 4ᵃ and may be moved to the position shown by the dotted lines in Fig. 2 of the drawings. Secured to the side of the frame 3ᵃ is a clamp catch 4ᶜ, a projecting portion of which extends over the segment 4ᵃ when it is in its closed position. When the clamps are unfastened the sides of the cage may be collapsed for shipment or packing.

The opening formed by the junction of the sides of the cage is partially closed by sets of trap fingers which correspond to each side member 3. Each set of trap fingers 5 consists of two long central fingers 5ᵃ and two shorter outer fingers 5ᵇ, as shown best in Fig. 2 of the drawings. The fingers of each set are comparatively broad and flat and are independently and removably secured on the upper side of the side frame 3ᵃ by means of a looped portion 5ᶜ. Each trap finger extends part way down the side of the cage and is bent downward near its end and curled at 5ᵈ for engaging the wire mesh as shown in Figs. 1, 2 and 3 of the drawings. A metal band 5ᵉ extends between the several trap fingers of each set and holds them in rigid relation. Cotter pins 5ᶠ are provided in the looped portion 5ᶜ of the trap fingers 5ᵇ which prevent the trap fingers from being accidentally removed.

Secured near to the lower side edge portions of one of the side members 3 are chains 6ᵃ which join each other and are connected to a chain 6. The chain 6 extends far enough above the cage to clear any rocks around which the cage may be placed, and is joined to a float cord 7. Ordinarily two floats 8 are used, the one positioned just above the upper extremity of the chain 6 and the other at the end of the cord 7 which reaches to the surface of the water. Each float 8 is substantially cylindrical with a tapering lower portion 8ᵃ as shown best in Figs. 8 and 9 of the drawings. A slot 8ᵇ is provided in the one side of the float 8 through which extends the float cord 7. The metal bands 8ᶜ are provided which extend around the float and tighten the sides of the slot 8ᵇ against the cord 7. The metal bands 8ᶜ also prevent the float from cracking or splitting. The end portion of the cord 7 is provided with a knot at the proper place so that the float will extend out of the water at either low or high tide.

It will be noted from Fig. 7 float chains are secured to opposite edges of one of the cage sides and when lowered into the water it will tend to lie bottom downward because of the greater weight of the bottom portion of the cage. It will also be noted that the trap will function equally well in practically any position in which the trap might come to rest when lowered to the rocky bottom.

For shipping the trap fingers 5 are removed and placed within the cage. The float chain, rope and other accessories are also placed in the cage and the sides dropped down by loosening the catches 4. Thus the trap when made ready for shipment takes up a minimum of space.

The trap is operated as follows:

Bait is positioned in the trap and the trap is submerged in the water, usually around rocky places where lobsters are customarily found. The lobster can easily crawl up the sides of the trap and over the trap fingers. The trap fingers 5 prevent oversize lobsters from entering the trap. The undersized lobsters which enter the trap will ordinarily work toward the corners of the trap where the small trap doors 2 are positioned. Furthermore, when the proper size lobster enters the trap he will cause the smaller lobsters, which may have entered to back away from him and out through the trap doors 2. The lobsters are removed by loosening the clamps 4 and swinging one side of the cage outward.

By reducing the size of the trap and the size of the openings the trap may be used for catching crabs. The operation in such a case is the same as above described.

It is obvious from the construction as illustrated in the drawings and described in the foregoing specification, that there is provided a lobster trap as aimed at and set forth in the objects of the invention, and though we have shown and described a particular construction, combination and arrangement of parts and portions, we do not wish to be limited to this particular construction, combination and arrangement but desire to include in the scope of our invention the construction, combination and arrangement substantially as set forth in the appended claims.

Having thus described our invention, what we claim as new and desire to secure by Letters Patent is:

1. In a device of the class described, a cage provided with a substantially square bottom member, inwardly foldable side members hinged to the sides of said bottom member, said side members connected together in elevated position and forming an opening, trap fingers removably mounted on said side members at their upper margins and extending from each of said side members, towards the center of said opening.

2. In a device of the class described, a substantially square bottom member, side members hinged to the sides of said bottom and adapted to be folded inwardly over said bottom member, clamp means for removably securing said side members together in elevated position, said bottom and side members forming a cage open at its upper portion, trap fingers extending from each of said sides, towards the center of said opening, and trap doors in the lower corners of the sides of said cage.

3. In a device of the class described, a cage open at its upper portion and provided with a substantially square bottom member and side members hinged thereto and adapted to be folded inwardly over said bottom, said bottom formed from metal bands and said sides formed from heavy wire mesh reinforced at the edges thereof, clamp means for holding said sides together, in elevated position and trap fingers secured to said upper portion of said cage.

4. In a device of the class described, a substantially square bottom and relatively low side walls, side members angularly hinged to the upper margins of said side walls and forming an opening of reduced area, clamp means for removably securing said side members together, and trap means positioned over said opening.

5. In a device of the class described, a cage including a substantially square bottom member and relatively low side walls, trapezoidal side members hinged thereto, removably securable together in elevated position and forming an opening of reduced area, said sides formed from a heavy wire mesh reinforced at the edges thereof, clamp means for holding said sides together, and trap means positioned over said opening.

6. In a device of the class described, a cage including a substantially square bottom member and relatively low side walls, trapezoidal side members hinged to the upper margin of said side walls, clamp means for removably securing said hinged side members together in elevated position, said side members forming a substantially square opening at their top edges, and a plurality of flat fingers removably secured to said side members and extending inwardly and downwardly from their upper margin forming a reduced opening substantially axially with said first opening.

7. In a device of the class described, a bottom cage portion of substantially right prism form, a superposed cage portion of frusto-pyramidal form, a polygonal opening at the apex of said latter portion forming an entrance, and outwardly opening trap doors positioned in the sides of said first cage portion.

In testimony whereof, we have hereunto set our hands at San Diego, California, this 26th day of October 1927.

FRANKLIN P. WARD.
OSCAR J. GOSSER.